United States Patent [19]

Yasuyuki

[11] Patent Number: 5,212,433
[45] Date of Patent: May 18, 1993

[54] ROBOT EMERGENCY STOP CIRCUIT

[75] Inventor: Shimoda Yasuyuki, Minamitsuru, Japan

[73] Assignee: Fanuc Ltd., Japan

[21] Appl. No.: 720,870

[22] PCT Filed: Dec. 11, 1990

[86] PCT No.: PCT/JP90/01619
§ 371 Date: Aug. 13, 1991
§ 102(e) Date: Aug. 13, 1991

[87] PCT Pub. No.: WO91/08870
PCT Pub. Date: Jun. 27, 1991

[30] Foreign Application Priority Data

Dec. 19, 1989 [JP] Japan .................................. 1-328775

[51] Int. Cl.[5] .................................................. B25J 9/22
[52] U.S. Cl. ............................ 318/568.13; 318/568.1;
200/1 V; 200/5 R
[58] Field of Search ..................... 318/560-636;
364/513, 191; 200/52 R, 1-6; 901/3, 5, 8, 12,
13, 15, 18-23; 395/88-99

[56] References Cited

U.S. PATENT DOCUMENTS

| | | | |
|---|---|---|---|
| 3,814,886 | 6/1974 | Piber | 200/1 V X |
| 4,095,072 | 6/1978 | Piber | 200/1 V X |
| 4,097,704 | 6/1978 | Piber | 200/1 V X |
| 4,100,383 | 7/1978 | Piber | 200/1 V X |
| 4,206,333 | 6/1980 | Savas et al. | 200/5 R |
| 4,737,697 | 4/1988 | Maruo et al. | 318/568 |
| 4,820,889 | 4/1989 | Seghetti | 200/1 B X |
| 4,878,000 | 10/1989 | Chen | 200/1 R |
| 4,903,318 | 2/1990 | Nagata | 200/5 R |
| 4,990,729 | 2/1991 | Toyoda et al. | 200/293.1 |

Primary Examiner—Paul Ip
Attorney, Agent, or Firm—Staas & Halsey

[57] ABSTRACT

A robot emergency stop circuit for bringing the robot to an emergency stop through a deadman switch installed on a teaching control device while the robot is being taught behavior patterns through the teaching control device. The deadman switch (DM1) causes the robot to operate according to commands received from the teaching control device as long as a pressure applied by a finger remains within a specified range. When the finger pressure becomes lower or higher than the specified range, a magnet switch in a servo amplifier (2) is turned OFF, bringing the robot to an emergency stop. Accordingly, if the robot should unexpectedly move, causing an operator to take an unintended action such as flinging the teaching control device away or holding it tightly, and thus apply an abnormal pressure to the deadman switch (DM1), then the contact point of the deadman switch (DM1) is shifted from the middle point of three contact points, thus turning the switch OFF. Accordingly, the robot can be stopped even if the operator takes an unintended action when a hazardous situation occurs.

4 Claims, 3 Drawing Sheets

ROBOT EMERGENCY STOP CIRCUIT

BACKGROUND OF THE INVENTION

1. Field of the Invention

The present invention relates to a robot emergency stop circuit for ensuring the safety of an operator when teaching a robot a job procedure through a teaching control device.

2. Background of the Related Art

In a known method of teaching behavior patterns to a robot and the like, in which a sequence of movements of the robot and an operating sequence are keyed to the robot's tools and the shape of a workpiece, an operator actually teaches these procedures to the robot through a teaching control device.

In such a method, to teach the robot an accurate positioning of the tools thereof, during the teaching session the operator must occasionally physically enter a robot working area and teach the robot while in the vicinity of the tools. In such a case, the operator carries a teaching control device provided with a robot emergency stop switch, called a deadman switch, to be able to stop the operation of the robot while in the working area thereof.

FIG. 3 shows a robot emergency stop circuit incorporating a traditional deadman switch, wherein all of the emergency stop pushbutton switches EMG1, EMG2, EMG3 and EMGT are connected in series with a deadman switch DM2 on the back of the teaching control device, through an alternating current power supply 1. In the diagram, four emergency stop pushbutton switches are shown, but in actual application, the number of emergency stop pushbutton switches corresponds to the number of pieces of external equipment to be controlled.

A servo amplifier (AMP) 2 supplies electric power to a servomotor which drives the robot, and includes a magnet switch operated by the alternating current power supply 1. Accordingly, if any of the switches, EMG1, EMG2, EMG3, EMGT or DM2 are turned OFF, then the electric power supplied from the alternating current power supply 1 to the magnet switch is interrupted, and thus the supply of electric power to the servomotor is interrupted. Therefore, if the operator releases the deadman switch DM2 during the teaching procedure, the deadman switch DM2 is then turned OFF as shown by an arrow A3, whereby the operation of the robot is immediately stopped.

The traditional deadman switch is a 2-position contact type in which the switch stays ON as long as the movable part of the switch is depressed by a finger, and is turned OFF when the pressure on the movable part is released.

Accordingly, even if a robot at rest should accidentally start and approach the operator during a teaching session, the robot can be immediately stops if the operator stays cool and releases the deadman switch DM2 on the teaching control device.

Such a robot emergency stop situation, however, is an unexpected and unwelcome occurrence for the operator, and thus the operator tends to become habitually nervous and jumpy. Therefore, even if the operator knows that the robot can be stopped by releasing the deadman switch during regular teaching session, in an extreme pressure situation the operator may take an unintended action. For example, the operator may be panic-striken by a sudden approach of the robot and may try to gain protection from the approaching robot by unconsciously holding on tightly to the teaching control device.

Obviously, if the operator holds the teaching control device tightly, the robot cannot be stopped by the traditional deadman switch; as it stays ON as long as the movable part thereof is depressed by a finger and will turn OFF only when the pressure on the movable part is released.

Such a problem would not occur even if the panicking operator unconsciously holds the teaching control device tightly, if the deadman switch were designed to stay ON as long as the movable part is not under pressure and to turn OFF when the movable part is depressed by a finger. This design, however, may also lead to a hazardous condition if the operator, panic-striken by an approaching robot, should drop or throw away the teaching control device.

SUMMARY OF THE INVENTION

The object of the present invention is to solve the problems described above by providing a robot emergency stop circuit which enables an operator to stop a robot even if the operator is placed in a hazardous situation during a teaching session due to a sudden actuation of a robot which is supposed to be at rest.

Therefore, to solve the aforementioned problems, the present invention provides a robot emergency stop circuit for bringing the robot to an emergency stop through the deadman switch provided on the teaching control device, while teaching behaviour patterns to the robot through the teaching control device. The robot emergency stop circuit features a deadman switch which comprises a 3-position contact switch designed to cause the robot to operate according to instructions given through the teaching control device as long as the pressure applied by a finger remains within a specified range, and to bring the robot to an emergency stop when the finger pressure becomes lower or higher than the specified range.

Namely, since the traditional deadman switch uses a 2-position contact switch, the operator must keep the deadman switch ON during the teaching procedure, and must physically move the deadman switch to the opposite state, i.e. the OFF state, to bring the robot to an emergency stop. In the present invention, however, because the deadman switch consists of a 3-position contact switch, the operator must consciously adjust the teaching control device so that the contact point of the switch is kept at the middle of the 3-position contact during the teaching procedure. Accordingly, if the robot should unexpectedly move, causing the upset operator to filing or throw the teaching control device away or to grip it tightly, then the setting of the deadman switch will be shifted from the middle point and thus the switch is turned OFF. Therefore, the robot will be brought to a halt by an unconscious action of an upset operator, if the operator is placed under hazard.

DESCRIPTION OF THE PREFERRED EMBODIMENT

One embodiment of the present invention will now be described with reference to the drawings.

Figure 2:
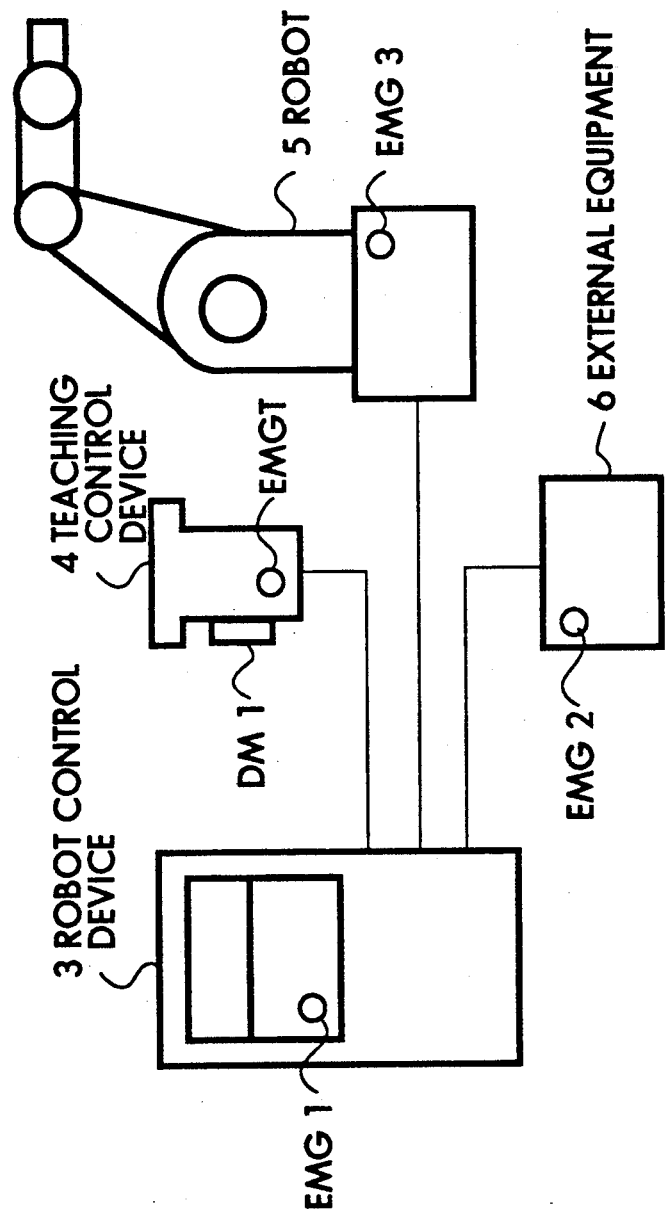
FIG. 2 is a diagram of a robot control system adopting the robot emergency stop circuit according to the present invention.

FIG. 2 shows the approximate configuration of the robot, control system in which the robot emergency stop circuit according to the present invention is applied.

A robot control device 3 controls the action of a robot 5, and is fitted on the front panel thereof with an emergency stop pushbutton switch EMG1 for interrupting a robot motion. An external unit 6 such as an interlock panel, which provides an interface between a teaching control device 4 and the robot, is connected to the robot control device 3.

The external unit 6 is provided with an emergency stop pushbutton switch EMG2, and the teaching control device 4 is provided with an emergency stop pushbutton switch EMGT and a deadman switch DM1. Further, the robot 5 is also provided with an emergency stop pushbutton switch EMG3. To stop a regular robot motion, the emergency stop pushbutton switches EMG1, EMG2 and EMG3 are used, and the deadman switch DM1 is used when an operator carries the teaching control device 4 for teaching the robot while in the vicinity of the robot's tools in a robot work area.

The deadman switch DM1 is used for ensuring the safety of the operator when operating the teaching control device 4. When the deadman switch DM1 is pressed with a finger to apply a regular pressure thereto, a normal teaching operation is implemented, and thus, the robot 5 is caused to operate in response to commands received from the teaching control device 4.

If the deadman switch DM1 is released (i.e., when the operator releases the deadman switch DM1), or if the operator's finger applies more pressure to the switch, the robot 5 is brought to an emergency stop.

Specifically, the deadman switch DM1 consists of or includes a 3-position contact switch able to detect a state wherein no finger pressure is applied, a state wherein a pressure within a specified range is applied, and a state wherein a pressure exceeding the specified range is applied.

Accordingly, the operator can manipulate and teach the robot 5 by consciously applying a pressure within the specified range to the deadman switch DM1, during the regular teaching procedure. Further, even if a robot which is supposed to be at rest during the teaching procedure is accidentally started, placing the operator in a hazardous situation and causing the operator to take an unintended action such as holding the teaching control device tightly or flinging it away, the robot 5 will be brought to an emergency stop because the deadman switch DM1 detects any pressure that is outside the aforementioned specified range.

In FIG. 2, the deadman switch DM1 is illustrated as if it were installed on a side surface of the teaching control device 4. In practice however, it is mounted in a recess in the back of the teaching control device 4. The deadman switch DM1 is installed in such a recess to minimize the chances of the occurrence of the following mishaps; if the deadman switch DM1 is mounted so that it projects from the teaching control device 4, as shown in FIG. 2, it may malfunction due to an impact shock if the teaching control device 4 is thrown away and dropped on the floor, or the like.

Figure 1:
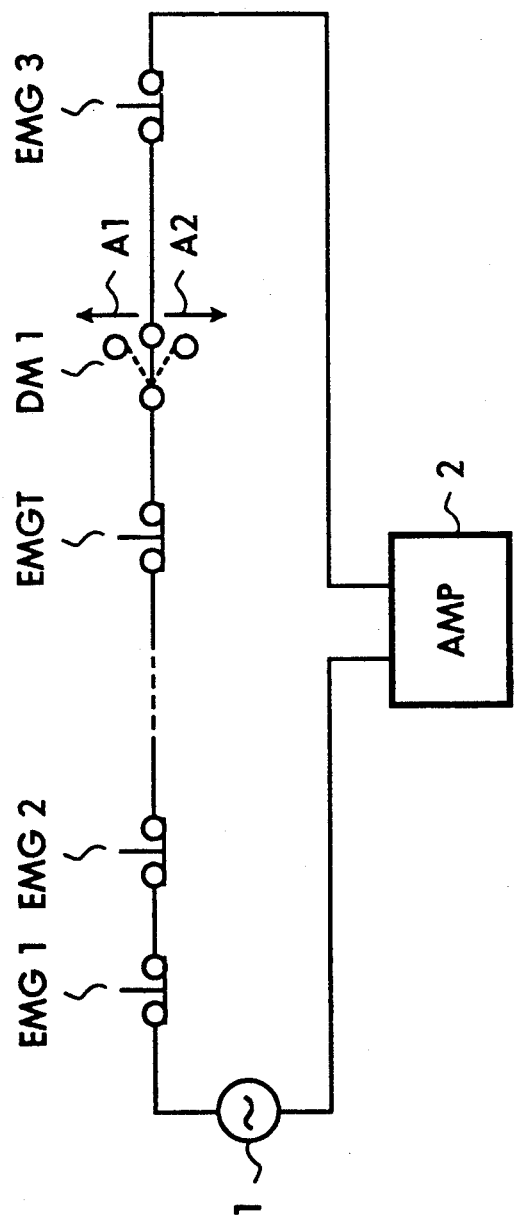
FIG. 1 is a circuit diagram of a robot emergency stop circuit according to the present invention.
Figure 3:
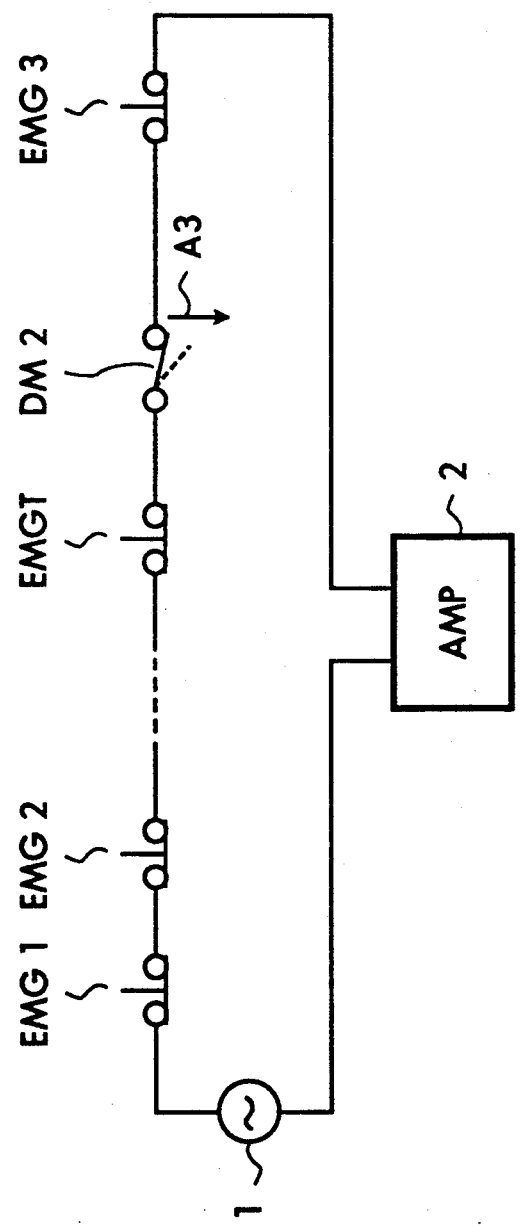
FIG. 3 is a robot emergency stop circuit comprising the traditional deadman switch.

FIG. 1 is the circuit diagram of the robot emergency stop circuit according to the present invention. In FIG. 1, the same symbols are applied to the same component elements as those shown in FIG. 3, and therefore, a description is thereof omitted.

The device in the embodiment is different from the traditional device in that the deadman switch DM1 uses a 3-position contact switch which is turned ON or OFF in accordance with three different conditions. More specifically, the deadman switch DM1 is designed to detect three different states; a state wherein the operator's finger is not in contact with the switch, and thus the finger pressure applied to the switch is zero (direction shown by an arrow A1), a state wherein the finger applies a regular pressure within the specified range to the switch, and a state wherein the finger applies a pressure exceeding the aforementioned specified range (direction shown by an arrow A2).

The deadman switch DM1 is designed to normally maintain the condition illustrated by the arrow A1, unless an extra pressure is applied. Accordingly, the operator is supposed to hold the deadman switch DM1 in such a manner that a pressure within the specified range is applied to the switch, before depressing an energizing pushbutton of the teaching control device 4, to thus energize the deadman switch DM1 and start the teaching operation. Accordingly, the electric power supplied from the alternating current power supply 1 is interrupted, to stop the electric power supplied to the servomotor and bring the robot to an emergency stop only when the deadman switch DM1 is released or subjected to a pressure exceeding the specified range, while the deadman switch DM1 is energized.

When the teaching operation through the teaching control device 4 is completed, the operator leaves the working area of the robot 5, and then depresses a deenergizing switch on the teaching control device 4 to deenergize the deadman switch DM1. Once the deadman switch DM1 is deenergized, the robot 5 will not stop even if the pressure is released from the deadman switch DM1.

Even when the deadman switch DM1 is in an energized state, if the deadman switch DM1 is turned OFF by the operator, a circuit for maintaining the OFF state is actuated to hold the emergency stop state until the switch is reset. Therefore, the robot is kept in a stop mode even if the deadman switch is held tightly and then released.

As described above, according to the present invention, an emergency stop in an emergency can be assured, to thus effectively prevent an accident, since the robot can be brought to a halt in response to an unintended action of an operator when upset by an unwanted movement of a robot, which is supposed to be at rest during a teaching session, which may bring hazard to the operator.

I claim:

1. A robot emergency stop circuit for bringing a robot being supplied power to an emergency stop while said robot is being taught behavior patterns using a teaching control device issuing instructions, said robot emergency stop circuit comprising:
    a deadman switch connected to the teaching control device, said deadman switch including:
        a 3-position contact switch having first, second and third contact positions; and a conductive element contractual with said first, second and third contact positions responsive to pressure applied to said deadman switch, said deadman switch supplying said robot with the power in response to the pressure applied by a user enabling the robot to receive the instructions and operate in accordance with the instructions issued by said teaching control device when the pressure applied by the user remains within a specified range connecting said conductive element to said second contact position and connecting the power supply to the robot, and said deadman switch stopping the supplying of the power to said robot when the pressure applied by the user becomes one of lower than said specified range connecting said conductive element to said first contact position and higher than said specified range connecting said conductive element to said third contact position, disconnecting the power supply from the robot.

2. A robot emergency stop circuit according to claim 1, further comprising a switch connected to and denergizing said deadman switch, and wherein when said deadman switch is deenergized by said switch, the robot will not stop even when the pressure applied by the user to said deadman switch is one of lower and higher than the specified range.

3. A robot emergency stop circuit according to claim 1, further comprising a switch connected to said deadman switch, and wherein when said deadman switch is placed in an off condition by the user, said switch is activated for maintaining the off condition until said deadman switch is reset.

4. A robot emergency stop circuit according to claim 1, wherein said deadman switch is pressure biased to place said conductive element in connection with said first position.

* * * * *

UNITED STATES PATENT AND TRADEMARK OFFICE
CERTIFICATE OF CORRECTION

PATENT NO. : 5,212,433
DATED : August 9, 1993
INVENTOR(S) : Yasuyuki SHIMODA

It is certified that error appears in the above-indentified patent and that said Letters Patent is hereby corrected as shown below:

On the title page: Item

[19]  Change "Yasuyuki" to --Shimoda--;

[75]  Change "Shimoda Yasuyuki" to --Yasuyuki Shimoda--;

Column 2, line 54, change "filing" to --fling--.

Column 3, line 7, after "robot" delete ",".

Signed and Sealed this

Twenty-second Day of March, 1994

Attest:

BRUCE LEHMAN

Attesting Officer     Commissioner of Patents and Trademarks